United States Patent [19]
Harvey

[11] Patent Number: 6,111,680
[45] Date of Patent: Aug. 29, 2000

[54] TRANSMITTING A SIGNAL USING DUTY CYCLE MODULATION

[75] Inventor: Philip C. Harvey, Hampton Falls, N.H.

[73] Assignee: Ebara Corporation, Tokyo, Japan

[21] Appl. No.: 08/982,210

[22] Filed: Dec. 1, 1997

[51] Int. Cl.$^7$ .......................... H04B 10/00; H04B 10/04; H04B 10/06
[52] U.S. Cl. .......................... 359/181; 359/195; 359/181; 359/189
[58] Field of Search .................................. 375/238, 272, 375/274, 303, 305, 237, 239, 295, 296, 297, 253; 359/144, 181, 182, 183, 184; 332/109; 329/312

[56] References Cited

U.S. PATENT DOCUMENTS

| | | | |
|---|---|---|---|
| 3,294,981 | 12/1966 | Bose | 307/88.5 |
| 3,418,578 | 12/1968 | Bose | 325/45 |
| 4,088,885 | 5/1978 | Meslener | 250/199 |
| 4,140,980 | 2/1979 | Cummings | 332/9 T |
| 4,812,815 | 3/1989 | Miyakoshi et al. | 455/612 |
| 4,998,294 | 3/1991 | Banks et al. | 455/612 |
| 5,077,619 | 12/1991 | Toms | 359/157 |
| 5,161,044 | 11/1992 | Nazarathy et al. | 359/187 |
| 5,321,543 | 6/1994 | Huber | 359/187 |
| 5,448,629 | 9/1995 | Bosch et al. | 359/187 |
| 5,526,164 | 6/1996 | Link et al. | 359/187 |
| 5,535,039 | 7/1996 | Belcher et al. | 359/187 |
| 5,548,435 | 8/1996 | Tahara et al. | 359/180 |

OTHER PUBLICATIONS

Application Specific Analog Products Databook, 1995 Edition.

7. 59–17076, Jan. 28, 1984, Control Method of Machine; Takashi Ogawa.

Roza, E., "Analog–to–Digital Conversion via Duty–Cycle Modulation," Nov. 1997, IEEE Transactions On Circuits and Systems–II Analog and Digital Signal Processing, vol. 44, No. 11, pp 907–914.

*Primary Examiner*—Jason Chan
*Assistant Examiner*—Agustin Bello
*Attorney, Agent, or Firm*—Armstrong, Westerman, Hattori, McLeland & Naughton

[57] ABSTRACT

A transmitter is provided for transmitting an analog signal. The transmitter has an input receiving the analog signal within a range of values. The transmitter also includes a duty cycle modulator generating a modulated two state signal having a maximum frequency at an intermediate value of the range. The duty cycle of the modulated signal is monotonically related to the analog signal while the frequency of the signal decreases with increase and decrease of the value of the analog signal from the intermediate value. The transmitter further includes an output for transmitting the modulated signal on a communication channel. A receiver is also provided that includes an input receiving the modulated two state signal from the transmitter, and a circuit for translating the received signals to an output analog signal.

28 Claims, 13 Drawing Sheets

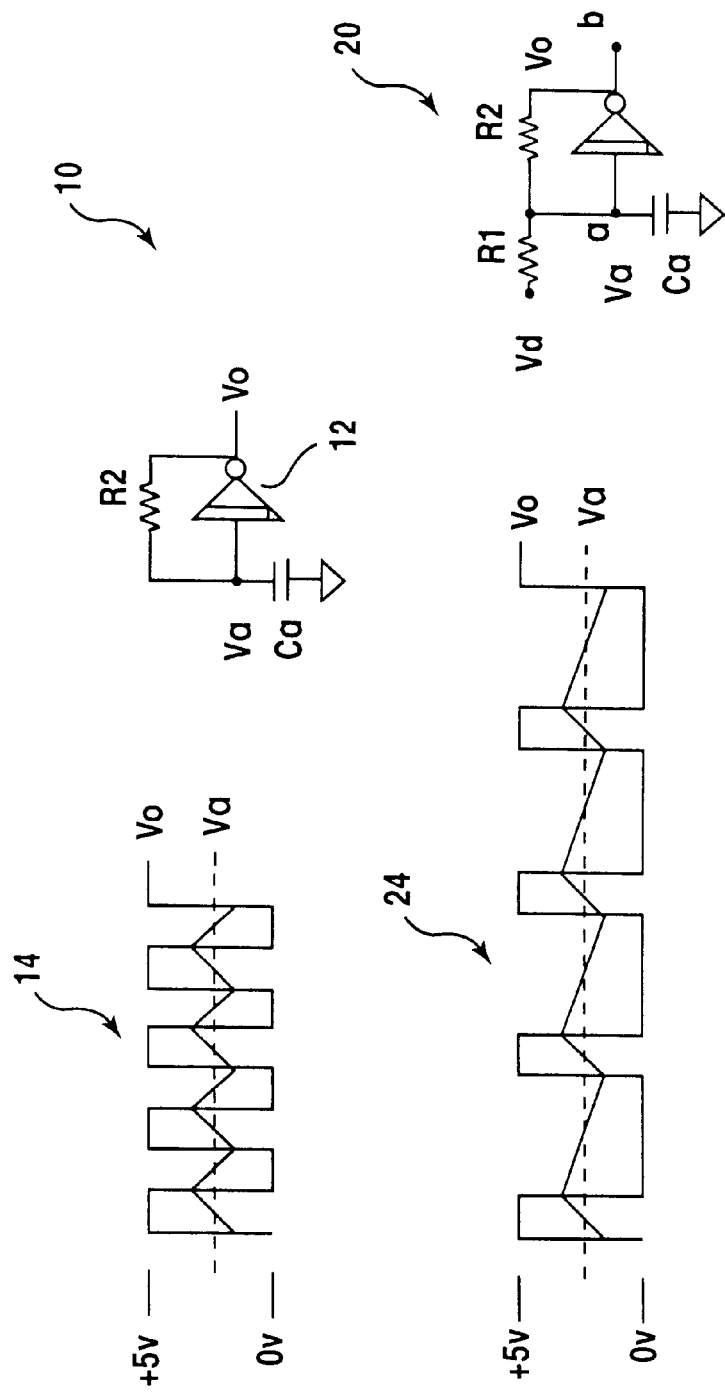

6,111,680

TRANSMITTING A SIGNAL USING DUTY CYCLE MODULATION

CROSS REFERENCE TO RELATED APPLICATIONS

This application is related to the commonly assigned applications "Ion source", filed herewith, Ser. No. 08/980,513, "Ion Implantation with Charge Neutralization", filed herewith, Ser. No. 08/980,509, and "Space Charge Neutralization of an Ion Beam", filed herewith, Ser. No. 08/980,512, all of which are incorporated by reference.

BACKGROUND

Analog signals are often transmitted using various types of optical signals across fiber optic cables. One technique of sending analog signals via an optical fiber cable is frequency modulation, that is, generating optical pulses at a frequency that is proportional to a parameter (e.g. voltage) of the analog signal to be transmitted and sending the optical pulses along the fiber optic link. The frequency of the optical pulses is then proportional to the transmitted parameter. At the receiving end, the analog signal is then reconstructed by detecting the frequency of the received signal.

Analog signals are also transmitted using pulse width modulation, in a train of pulses that occur at constant frequency.

There is a need for transmission over fiber optic channels and other channels (e.g. RF, wire, or other modes) in a manner that provides improved performance relative to cost and size of the required components.

SUMMARY OF THE INVENTION

In one general aspect, the invention features a transmitter for transmitting an analog signal. The transmitter has an input receiving the analog signal within a range of values. The transmitter also includes a duty cycle modulator generating a modulated two state signal having a maximum frequency at an intermediate value of the range. The duty cycle of the modulated signal is monotonically related to the analog signal while the frequency of the signal decreases with increase and decrease of the value of the analog signal from the intermediate value. The transmitter further includes an output for transmitting the modulated signal on a communication channel.

In another general aspect, the invention features a receiver for receiving a signal. The receiver includes an input receiving a modulated two state signal from a transmitter. The signal has a maximum frequency at an intermediate value of a range of input signal to the transmitter and the duty cycle of the modulated signal is monotonically related to the analog signal while the frequency of the signal decreases with increase and decrease of the value of the analog signal from the intermediate value. The receiver also includes a circuit for translating the received signals to an output analog signal.

In yet another general aspect, the invention features an ion implanter for implanting ions in a workpiece. The ion implanter includes an apparatus for generating an ion beam and directing it toward a surface of a work piece. The ion implanter also includes a transmitter. The transmitter has an input receiving the analog signal within a range of values. The transmitter also includes a duty cycle modulator generating a modulated two state signal having a maximum frequency at an intermediate value of the range. The duty cycle of the modulated signal is monotonically related to the analog signal while the frequency of the signal decreases with increase and decrease of the value of the analog signal from the intermediate value. The transmitter further includes an output for transmitting the modulated signal on a communication channel. The ion implanter also includes a receiver that includes an input receiving the modulated two state signal from the transmitter, and a circuit for translating the received signals to an output analog signal.

Preferred embodiments may include one or more of the following features.

With increase of the analog signal from the intermediate value, the duration of a first of the two states increases more rapidly than does the second state decrease in duration, and with decrease of the analog values, the duration of the second state increases more rapidly than does the first state decrease. The duty cycle is related to an amplitude the analog signal.

In the transmitter, the output is a fiber optic transmitter for transmitting a light signal corresponding to one of the states. The modulator is a square wave oscillator having a circuit having a switching threshold such a Schmitt logic circuit, e.g. a NAND gate or inverter. The input of the Schmitt inverter is connected to a feedback circuit connecting the input to the output of the inverter and a capacitor connected to the input of the inverter.

In the transmitter the modulator has an input and an input receiving the analog signal. A feedback circuit is connected to the output of the modulator. The input includes a circuit for comparing a signal from the feedback circuit to the analog signal.

The input of the transmitter includes a differential amplifier, connected to the input of the modulator. The amplifier has a first and second input, the first being connected to the feedback signal and the second input being connected to receive the analog signal.

In the receiver, the circuit for translating increases the output analog signal from an intermediate output value corresponding to intermediate input value when the duration of a first of the two states increases more rapidly than does the second state decrease in duration, and decreases the output analog signal, when the duration of the second state increases more rapidly than does the first state decrease. The circuit translates the received signal to an analog signal by relating the duty cycle of the received signal to a reference voltage. The circuit is a low pass filter for translating the modulated signal to the analog signal which may an active or a passive filter. The input of the receiver receives the modulated signal as an optical signal via a fiber optic cable.

The ion implanter includes a component controllable by the analog signal such as a programmable power supply. The ion implanter also includes a component, an attribute of which is represented by the analog signal, such as a programmable power supply. The represented attribute may be an operating voltage or current of the power supply.

Embodiments of the invention may include one or more of the following advantages.

In one general aspect, the invention relates to generating and transmitting a two-state pulse signal, whose timing represents the value of an analog signal, and transmitting the two-state signal through fiber optics to a receiver that translates the signal back into an analog signal. In important embodiments, the pulses occur at a maximum frequency centered on an intermediate value of a parameter to be transmitted, the frequency of the pulses decreasing from that frequency with either increase or decrease of the parameter, by corresponding modulation of the negative or positive pulse width the width of opposite pulse being much less changed. By use of an operational feed back amplifier, a simple circuit that implements such modulation is rendered precise, capable of being employed in a control signal for highly sensitive processes, of which ion implantation is an excellent example.

Some embodiments of the invention can be constructed from commercially available components so as to be small in size. Such embodiments then can fit inside programmable power supplies or be attached to the outside of programmable power supplies. Therefore, the distance of electrical wire carrying the analog control signals can be quite short and the effect of electromagnetic interference on the analog signals can be reduced.

BRIEF DESCRIPTION OF THE DRAWINGS

FIG. 4A is a circuit diagram for an oscillator used in the modulator of FIG. 4.

FIG. 4B is a circuit diagram for a duty cycle modulator used in the modulator of FIG. 4.

DESCRIPTION

The signal transmission method of and apparatus of the invention will be described in conjunction with the process of ion implantation.

Briefly, an ion implanter typically has a number of components (e.g. programmable power supplies) that are controlled or monitored by analog signals. To transmit these analog signals from a control unit to the component, a transmitter uses a modulator to translate the analog signal to a two state signal whose duty cycle (i.e. the ratio of the 'ON' periods of the signal to the overall period of the signal) is either directly or inversely proportional to the analog signal. This two state signal is then transmitted in a manner substantially immune to ambient magnetic or electric fields. In the preferred embodiment shown, the two state signal is transmitted using light signals along optical fiber cables. A receiver at the component in the ion implanter receives the optical signal and translates the signal to the analog signal which is then used for controlling the component. Similarly, analog signals used for monitoring the component are transmitted back to the control unit.

Prior to describing embodiments of the transmitter and receiver used for transmitting such analog signals, we will first describe a typical implanter in which such transmitters and receivers are used to effect control of the ion implantation process.

Figure 1:
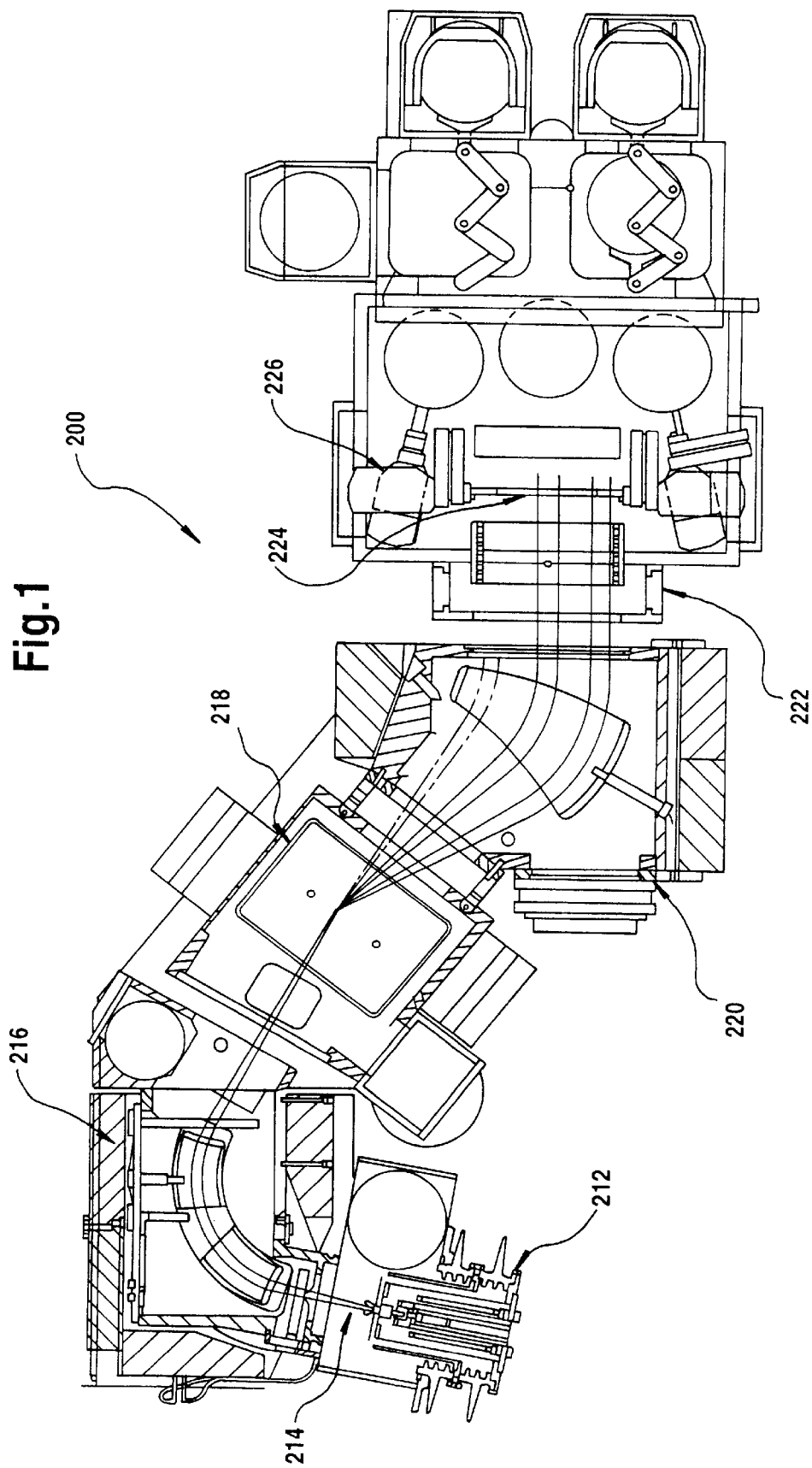
FIG. 1 shows a plan view of an ion implanter.

FIG. 1 shows an example of an ion implanter 200 in which embodiments of this invention are used. General features of such an ion implanter are disclosed in e.g. U.S. Pat. No. 5,393,984, hereby incorporated by reference.

Ion implanter 200 is composed of an ion source 212, an extractor electrode 214, an analyzer magnet 216, a scanner magnet 218, a collimator magnet 220, a plasma charge neutralizer 222 and a wafer 224. Generally, ion implanter 200 produces a ribbon-shaped beam which in some embodiments has a range of energies from 1 keV to 100 keV. The beam is a high current, high perveance beam, as explained in the referenced patent. The beam is magnetically scanned over the wafer in one direction. The wafer may also be moved in another direction to enable scanning in a second direction.

Ion source 212 generates positively charged ions for implantation, including gases such as argon, nitrogen, disassociated boron (as in BF3), Arcin, and Phosphine. Solids may also be implanted after vaporization. Such solids include Phosphorus, arsenic, and antimony. Other material may also be implanted. The ions emerge from an emission slit, extracted by extraction electrode 214, which has a negative potential compared to the source. The shape and position of extractor electrode 214 is such that a well-defined ion beam emerges from the electrode.

Analyzer magnet 216 then analyzes the ion beam by removing undesired impurities according to the ion momentum to charge ratio (Mv/Q, where v is the velocity of the ion, Q is its charge, and M is its mass). Scanner magnet 218 then scans the ion beam in a direction perpendicular to the path of the beam. Following scanning, collimator magnet 220 reorients the ion beam such that the beam is parallel in the entire scan area.

Ion implanter 200 is sized to enable implantation on wafers that have a diameter of up to 300 millimeters. A wafer holder 226 holds wafer 224, at a selected angle within a range of angles of incidence of the beam to the wafer, preferably from normal incidence to the ion beam to less than 10°. In this embodiment, the ion beam is a ribbon shaped beam having a beam height (i.e. the length of the beam along a cross section of the beam) of 90 mm at the source and 60 mm at the wafer.

Figure 2:
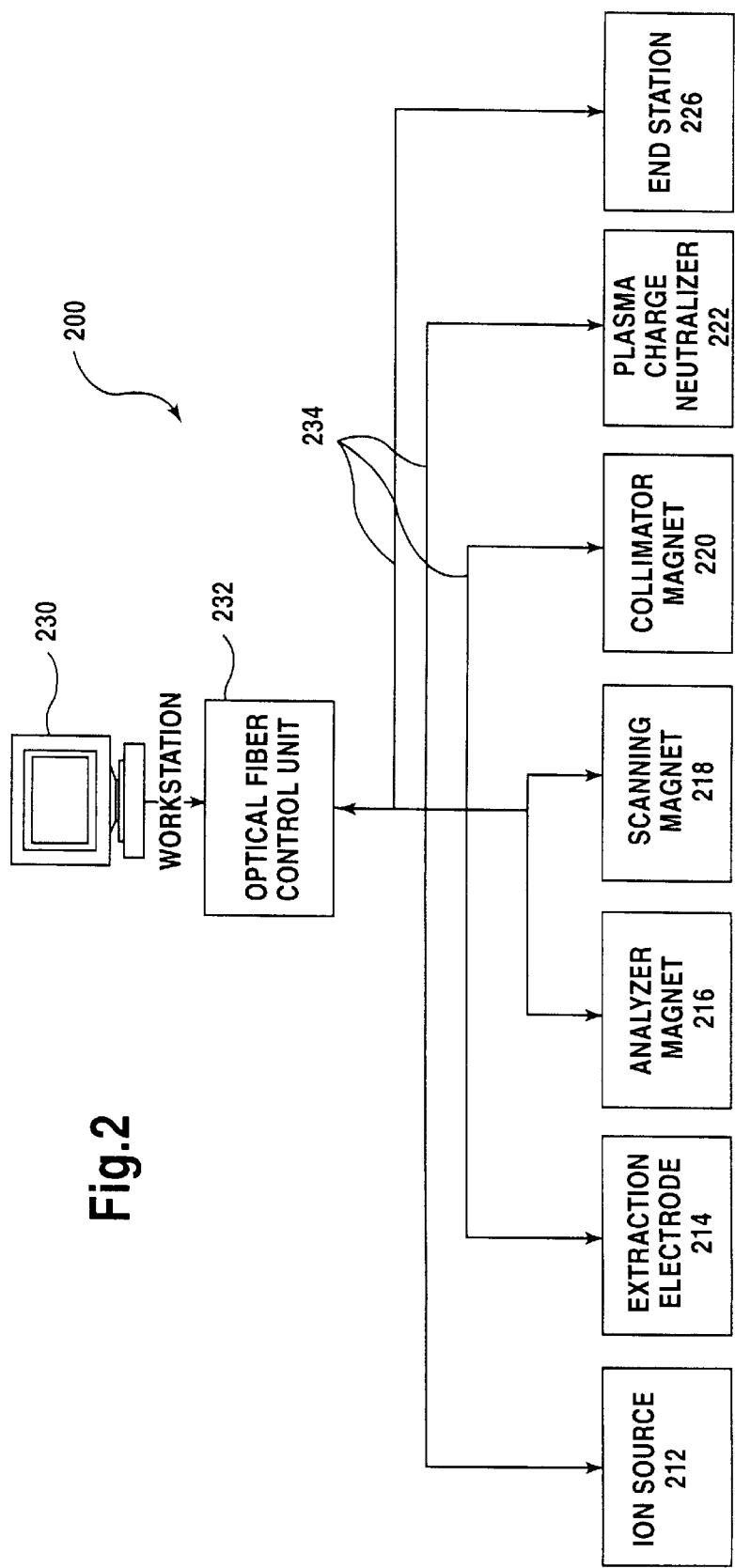
FIG. 2 is a schematic diagram of a control system for the ion implanter in FIG. 1.

Referring to FIG. 2, during operation, a remotely located computer 230 is used by an attendant or a software program to control various components of implanter 200. Computer 230 is used to regulate the various valves, power supplies, and other components of ion implanter 200. Computer 230 is also used to monitor the operation of these components. Computer 230 provides the necessary commands to an optical fiber control unit 232 which in turn translates those commands into optical signals and transmits those signals via fiber optic cables 234 to components of ion implanter 200. In the case of some components, the control signals from computer 230 are analog signals and in the case of others digital.

Figure 3:
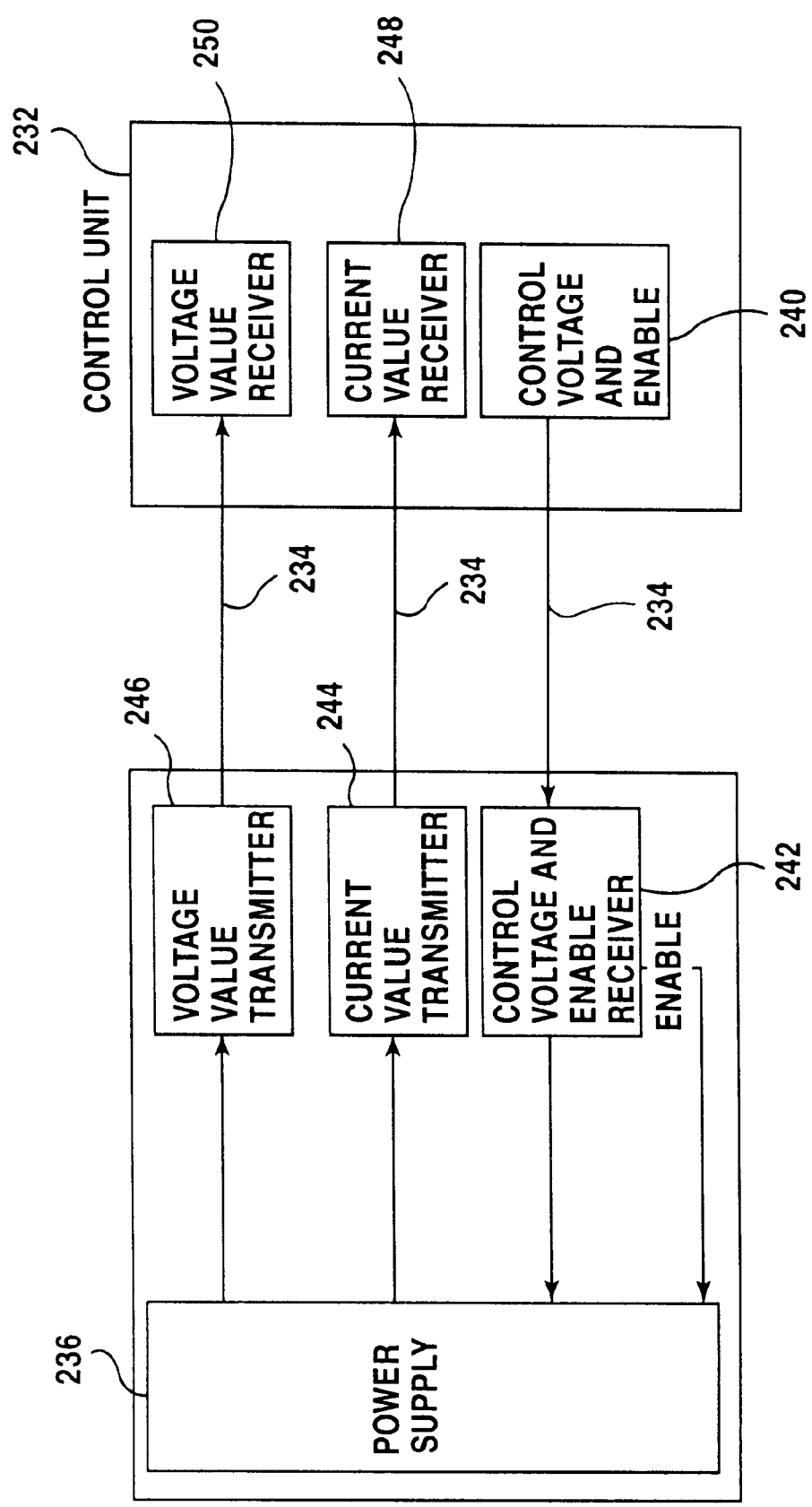
FIG. 3 is a schematic diagram of a portion of the control system of FIG. 2 used for controlling a programmable power supply.

FIG. 3 shows an embodiment of transmitters and receivers for sending and receiving the control and monitoring signal in the case of a programmable power supply in implanter 200. Two control signals are typically used to operate the programmable power supply. The first signal is an enable signal that in essence turns the programmable power supply on or off. This signal is a digital signal and can be transmitted as a digital signal. The second signal is an analog DC voltage signal within a preselected range of voltages (e.g. between 0–10V). This signal is the control signal (or programming) signal used to control the operation of the programmable power supply. The preselected range of voltages of this signal may represent various ranges of values (e.g. 0–1000V, 0–8V, or 0–100 Amps) that are controlled by the analog signal. Generally, it is undesirable to transmit control signals, especially an analog signal, using electrical signals via electrical conductors. Ion implanters generate considerable electromagnetic interference as a result of arcing in the implanter and of the strong magnets used in implanter 200. This electromagnetic interference can in turn affect the accuracy of transmitted control signals carried by electrical conductors. To transmit the control signal, therefore, the analog signal is translated into an optical signal which represents the analog voltage.

Programmable power supply 236 also provides two analog voltages corresponding to the current and the voltage at which the power supply operates at any point in time. Computer 230 monitors both of these signals. To avoid electromagnetic interference, these analog values are also sent using optical signals.

In the case of programmable power supply 236 in FIG. 3, a control voltage and enable transmitter 240 sends the enable and control signals in the form of optical signals to a control voltage and enable receiver 242 which receives the optical signals and translates them to appropriate control voltage signals. Transmitters 246 and 244 in turn send the current value and voltage value monitoring signals from programmable power supply 236 to receivers 250 and 248.

Prior to describing in detail the structure and operation of the above transmitters and receiver, we will first describe the operation of a type of modulator used in the above transmitter to translate the analog signal into a two state signal whose duty cycle is the only characteristic of the signal proportional to the analog signal. We will also describe how the two state signal is translated back to the analog signal at the receiver.

Figure 4:
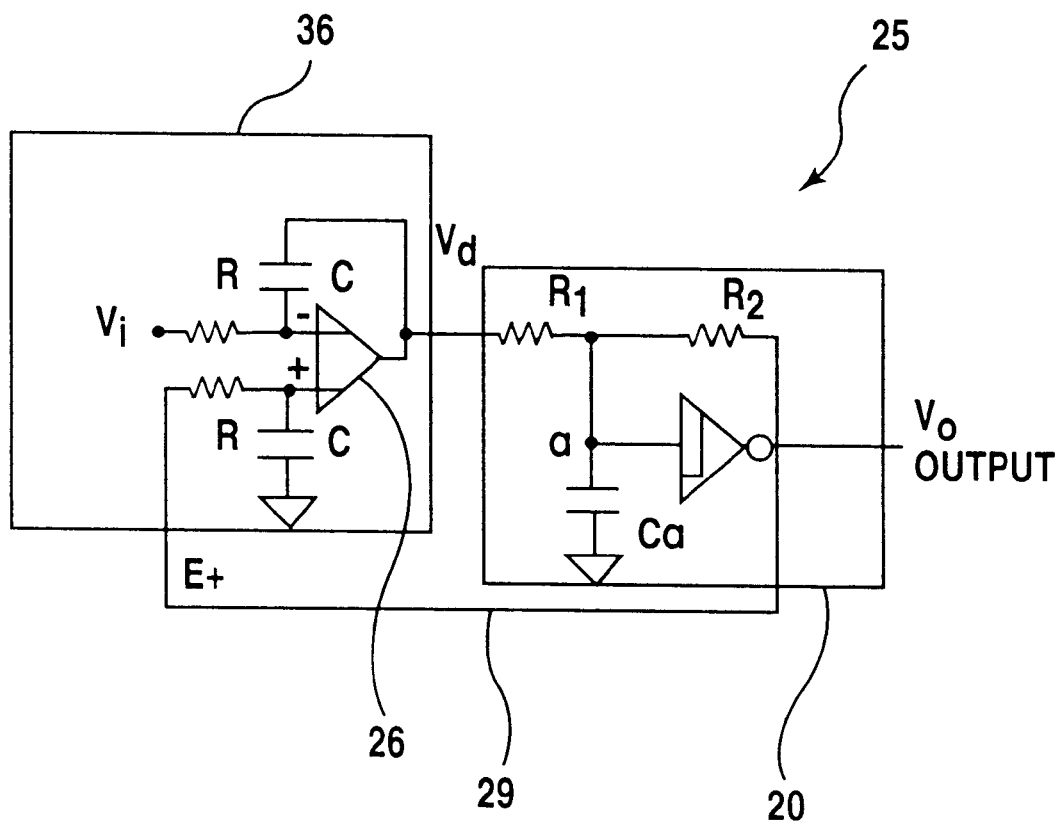
FIG. 4 is a circuit diagram for a modulator according to the present invention.

FIG. 4 shows a circuit for a modulator used in transmitter in implanter 200. Modulator 25 translates an analog signal Vi into a two state signal Vo whose duty cycle represents parameter of analog signal Vi. The maximum frequency of variation of the two state signal is controlled with a midrange value, the frequency decreasing monotonically with increase or decrease of the voltage, current or other parameters of the analog signal that is to be transmitter. It should be noted that duty cycle of Vo is proportional to the inverse of signal Vi because modulator 25 acts as an inverter, as will be described below in detail. In FIG. 4, modulator 25 includes a duty cycle modulator 20 which translates the voltage of the analog signal to a two state signal whose duty cycle is proportional to the analog signal Vi. Modulator 25 also includes an input circuit (or amplifier) 36 that is supplied by a feedback circuit 29. Input circuit 36 uses the feedback signal from feedback circuit 29 to improve the performance of duty cycle modulator 20. We will now describe each of these components in detail.

Referring to FIG. 4A, modulator 20 includes an oscillator 10. Oscillator 10 includes a CMOS Schmitt trigger inverter 12, an integrating capacitor Ca, and a feedback resistor R2. A Schmitt circuit typically has a trigger threshold, meaning that the output of the circuit changes when the input voltage crosses the threshold. Schmitt inverter 12 has two thresholds, one for an ON output and one for an OFF output.

Figure 5:
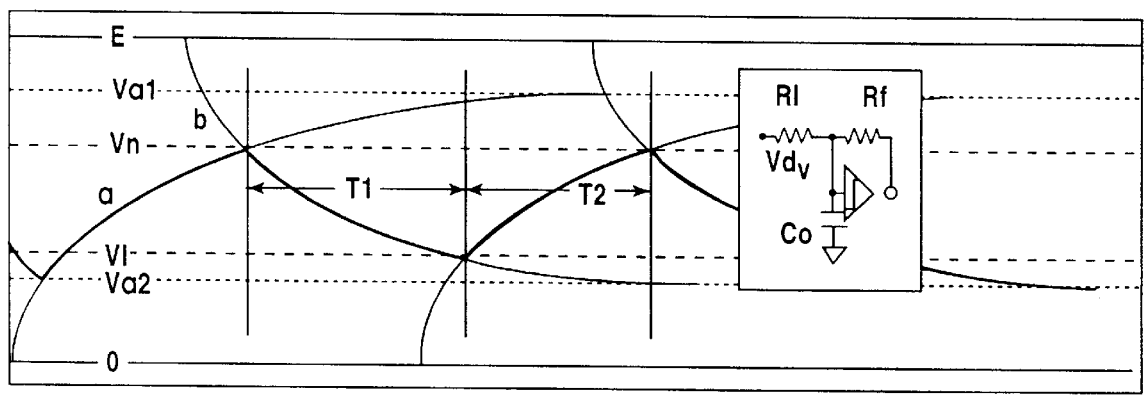
FIG. 5 is a graph of voltages at node 'a' in duty cycle modulator of FIG. 4.

Graph 14 in FIG. 4A shows the output voltage Vo of oscillator 10 and a voltage Va measured at node a in oscillator 10. A positive output voltage Vo charges up capacitor Ca until the Schmitt's upper triggering input threshold is reached, whereupon the output Vo is reduced to a voltage that represents an OFF value (typically ground). Capacitor Ca then discharges to the lower triggering input threshold which causes output voltage Vo to switch to a voltage that represents an ON value (typically a voltage near the power supply voltage). In this manner, the input voltage Va travels between the upper and lower triggering input thresholds, and the output voltage Vo travels between ground and the upper voltage of the voltage supply. (It should be noted that, referring to FIG. 5, although Va is represented as a triangular wave, the voltage Va is characterized in more detail by two exponential decay curves representing the charging and discharging of capacitor Ca.)

Because inverter 12 is a CMOS inverter, it has very large input resistance and therefore a very low input current. Therefore, the average DC current into node 'a' through feedback resistor Ra is substantially zero. Because of that, the average DC value of output voltage Vo is equal to the average DC value of the Schmitt input voltage Va. That value approximately equals the average of the two Schmitt trigger voltage threshold levels.

Duty cycle modulator 20 is a modulator based on oscillator 10. In the case of duty cycle modulator 20, a signal voltage Vd is applied via a resistor R1 to node 'a' of the oscillator. Resistor R1 can be of about equal value to a feedback resistor R2. Graph 24 illustrates voltages Va and Vo when a Vd voltage greater than Va is applied. In such a case, the OFF periods of output voltage Vo increase, reducing the duty cycle and reducing the modulation frequency. When the input signal decreases below Va, the ON periods of the output voltage Vo increase instead, increasing the duty cycle but still reducing the modulation frequency. The output duty cycle is thus roughly proportional to the negative amplitude of Vd-Va. The average output voltage decreases as Vd increases, since the voltage is forced to remain between the input threshold trigger voltage levels and no net current can flow into or out of node 'a'.

In the case of duty cycle modulator 20, for DC voltages in the operating range, a change in an applied input voltage results in an opposite polarity output voltage change and therefore duty cycle decreases as Vd increases. (If the resistor values equal one another, duty-cycle modulator 20 acts approximately as a unity gain inverter or amplifier.) In other embodiments, an increase in the applied voltage may increase the duty cycle.

Figure 6:
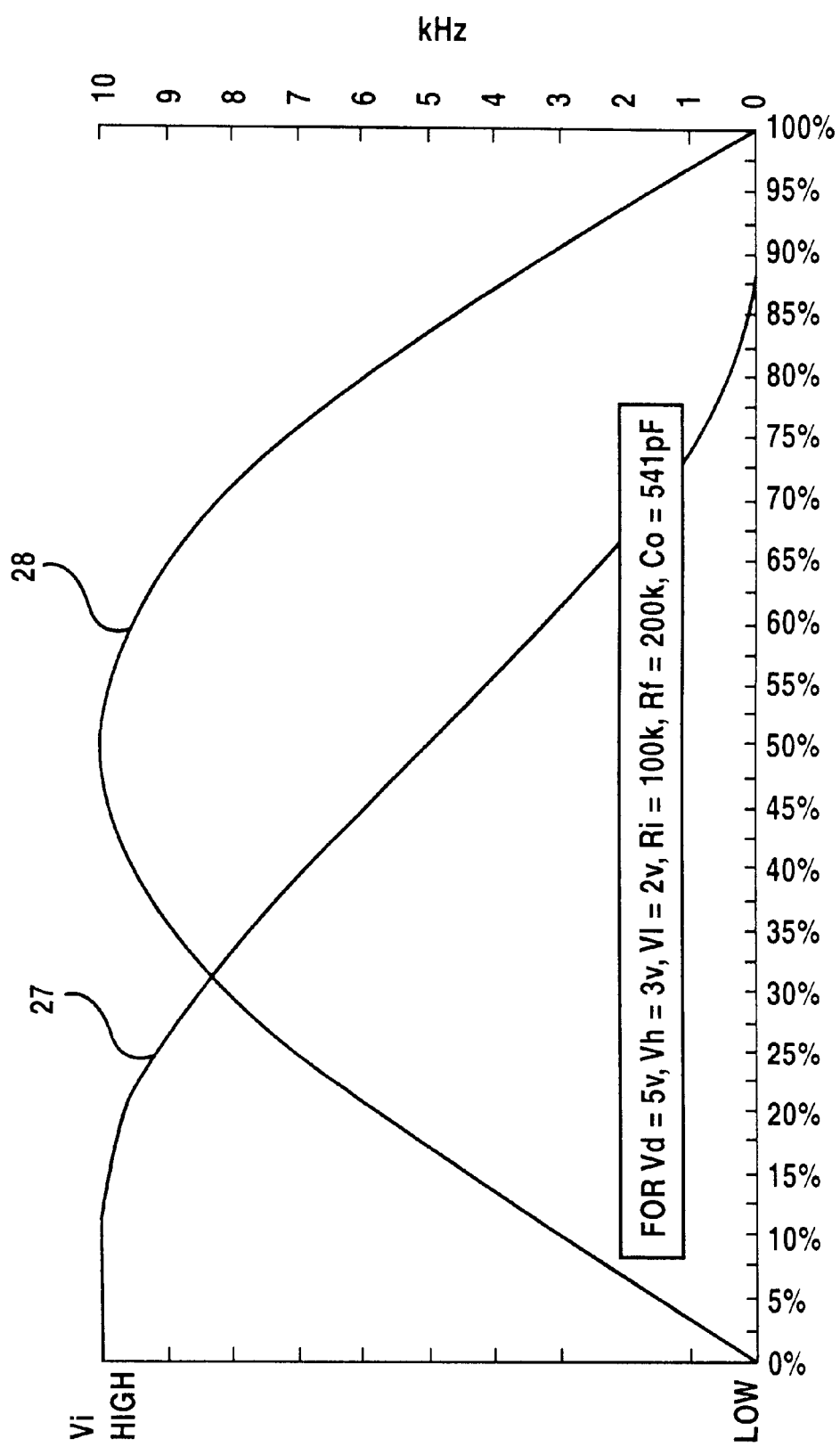
FIG. 6 is a graph of voltage, duty cycle, and frequency of the modulator of FIG. 4.

The graphs in FIG. 6 illustrate typical relationships between modulator 20 input signal Vd and frequency and duty cycle of output signal Vo. Graph 27 shows the relationship between input voltage Vd and duty cycle of output signal Vo. As can be seen, the lower the voltage the higher the duty cycle of Vo is. If the input signal is beyond some upper limit, the oscillation will stop and the inverter becomes saturated, with zero output voltage and 0% duty cycle. As stated above, the voltage at node 'a' is characterized by two exponential decay curves. Near 0% duty cycle, the relationship between voltages Vo and Vd becomes increasingly nonlinear, since one of the exponential decay curves becomes very long. Similarly, at a lower input signal limit, the modulator becomes nonlinear and saturates in the other direction, i.e. outputting a constant 100% ON signal because of the other exponential becomes very long. However, as is apparent from graph 27, the relationship between the input voltage and duty cycle of output signal Vo is monotonic. Monotonic relationship, mathematically is defined as a relationship characterized by the derivative of the transfer function always having the same polarity. Monotonic relationship is an advantageous feature in a closed-loop systems such as modulator 25, because if the polarity of the transfer function changes, the feedback may change to positive, resulting in unwanted hangups or oscillations. An example of a monotonic relationship is a proportional relationship where that Vo equals m*Vi+B where m is a real number representing an amplifier gain and B is a real number representing a constant voltage.

Graph 28 illustrates the relationship between the frequency of output signal Vo and the duty cycle of output signal Vo. The difference between duty cycle modulation of duty cycle modulator 20 and frequency modulation and pulse width modulation is apparent from graph 28. Unlike a frequency modulated signal, the frequency of output signal Vo of duty cycle modulator 20 does not represent the input analog signal. Indeed, except for the peak frequency output signal Vo, all other frequencies represent at least two different duty cycles. Moreover, unlike a pulse width modulated signal, the frequency of output signal Vo of duty cycle modulator 20 varies and is not constant with input signal changes.

In other words, as it is readily apparent, a maximum frequency of pulses is centered on an intermediate value of analog signal Vd. The frequency of the pulses decreases from that frequency with either increase or decrease of Vd, by corresponding modulation of the negative or positive pulse width the width of opposite pulse being much less changed.

The net effect on the output signal as shown in FIG. 6 is that, with increase of the analog signal Vd from the intermediate value, the duration of ON periods increases more rapidly than does the duration of the OFF periods decrease. Similarly, with decrease of the analog signal Vd, the duration of OFF periods increases more rapidly than does the duration of the OFF periods decrease.

Referring back to FIG. 4, having described duty cycle modulator 20 and its operation, we will now describe input circuit 36 and its operation with reference to the overall operation of modulator 25. Briefly, input circuit 36 is supplied by an input analog signal Vi which is to be modulated and an output signal of modulator 20 via feedback circuit 29. Input circuit compares these two signals and outputs a signal to duty cycle modulator 20 which drives modulator 20. The signal from input circuit 36 to duty cycle modulator 20 causes the modulator to change output signal Vo so that it approximates input signal Vi. In short, input circuit 36 via feedback circuit 29 makes the over all circuit of modulator 25 to act as a voltage follower. This makes modulator 25 more precise than modulator 20 operating by itself.

More specifically, input circuit 36 includes a differential amplifier 26 that is connected as an integrator. In modulator 25, the output of duty cycle modulator 20 is supplied at the positive input of differential amplifier 26 via a feedback line 29 and input signal Vi is applied to the negative input of differential amplifier 26. output of differential amplifier 25 then is the integral of the difference between output signal Vo and input signal Vd. The output of the differential amplifier is then applied to the input of duty cycle modulator 20. The difference between output signal Vo and input signal Vi will continually drive the integrator to readjust the modulator level, until the difference between signals Vi and Vo become as small as differential amplifier 26 can detect. Since only the DC components of input and output signals Vi and Vo have finite integrals, modulator 25 attempts to make the DC value of output signal Vo follow DC value of input Vi (i.e. modulator 25 acts as a DC voltage follower). In other words, differential amplifier 26 acts as a DC error servo amplifier that continually strives to bring the average DC value of output signal Vo of duty cycle modulator 20 closer to the DC value of input signal Vi. Because the DC gain of a normal operational amplifier is enormous, the modulation error is reduced. Because the modulator's DC output voltage is proportional to its duty cycle, the output duty cycle is forced by the integrator feedback to be proportional to the input signal voltage.

Figure 4C:
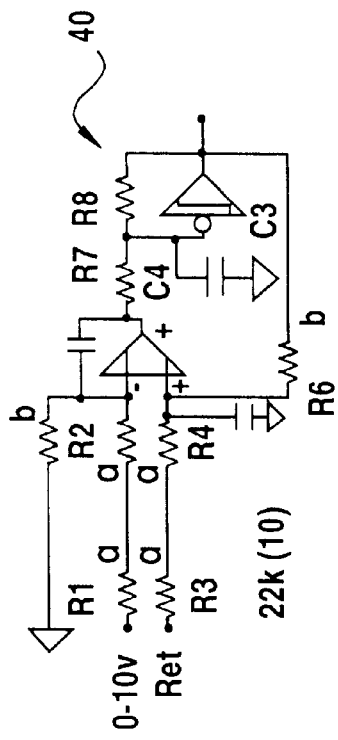
FIGS. 4C–4E are equivalent circuit diagrams for modulator of FIG. 4.
Figure 4D:
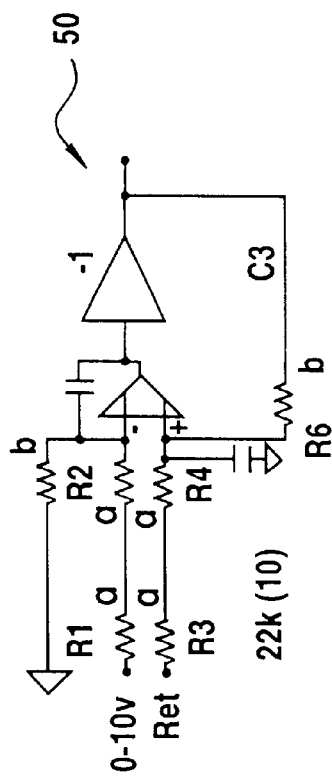
Figure 4E:
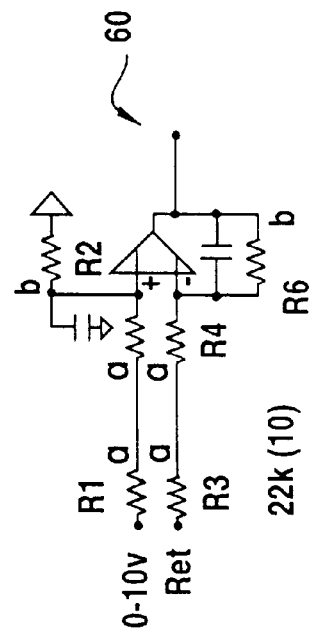

Referring to FIGS. 4C–4E, note that modulator 25, consisting of input circuit 36 and duty-cycle modulator 20, may be configured as a differential-input amplifier. Being connected as a differential amplifier assists with operating in multi-channel environments, such as ion implanter 200, where signal "ground" or reference potential may differ from one another, even in the same locality.

FIGS. 4C–4E show how an inverting modulator such as modulator 25 combines with the operational amplifier to create a net differential amplifier. Circuit 40 is a differential equivalent to single-ended modulator 25. Circuit 50 shows circuit 40 with duty cycle modulator 20 represented as an equivalent inverting amplifier that results in feed back signal being negative. Circuit 60 shows that combining duty cycle modulator 20 with input circuit 36 results in a composite differential amplifier, where input polarities are properly connected for conventional negative feedback.

We have now described modulator 25 and how it translates an analog signal into a duty cycle-modulated two state signal for transmission to a receiver. The receiver has precisely regulated voltage supply and has a priori information as to the relationship of the selected intermediate voltage (or other parameter of the analog signal to be transmitted) at which there is equal duration of the ON state and OFF state (point of maximum frequency of changed state).

The receiver is designed to receive a duty cycle modulated signal as characterized by graphs 27 and 28 in FIG. 6. In order for the receiver to convert the transmitted signal to an analog signal, the receiver uses the relationship between the input analog signal and the duty cycle of the transmitted signal (i.e. graph 27 in FIG. 6) to translate the duty cycle of the received signal into an analog signal by relating the duty cycle of the received signal to a reference voltage based on graph 27. In essence, the receiver multiplies the duty cycle by the transfer function that represents graph 27.

In one sense, the receiver increases the output analog signal from an intermediate value that represents the input signal value at the transmitter corresponding to the peak frequency, when the duration of ON periods increases more rapidly than does duration of OFF periods. The receiver in turn decreases the output analog signal, when the duration of the OFF periods increases more rapidly than does the duration of ON periods decrease.

To convert the signal, the receiver uses a low pass filter. In the embodiments that will be described below, two types of low pass filters are used: a two pole passive low pass filter and a three pole Butterworth active low pass filter. However, in other embodiments, other types of filters may also be used, depending on the application.

Figure 7:
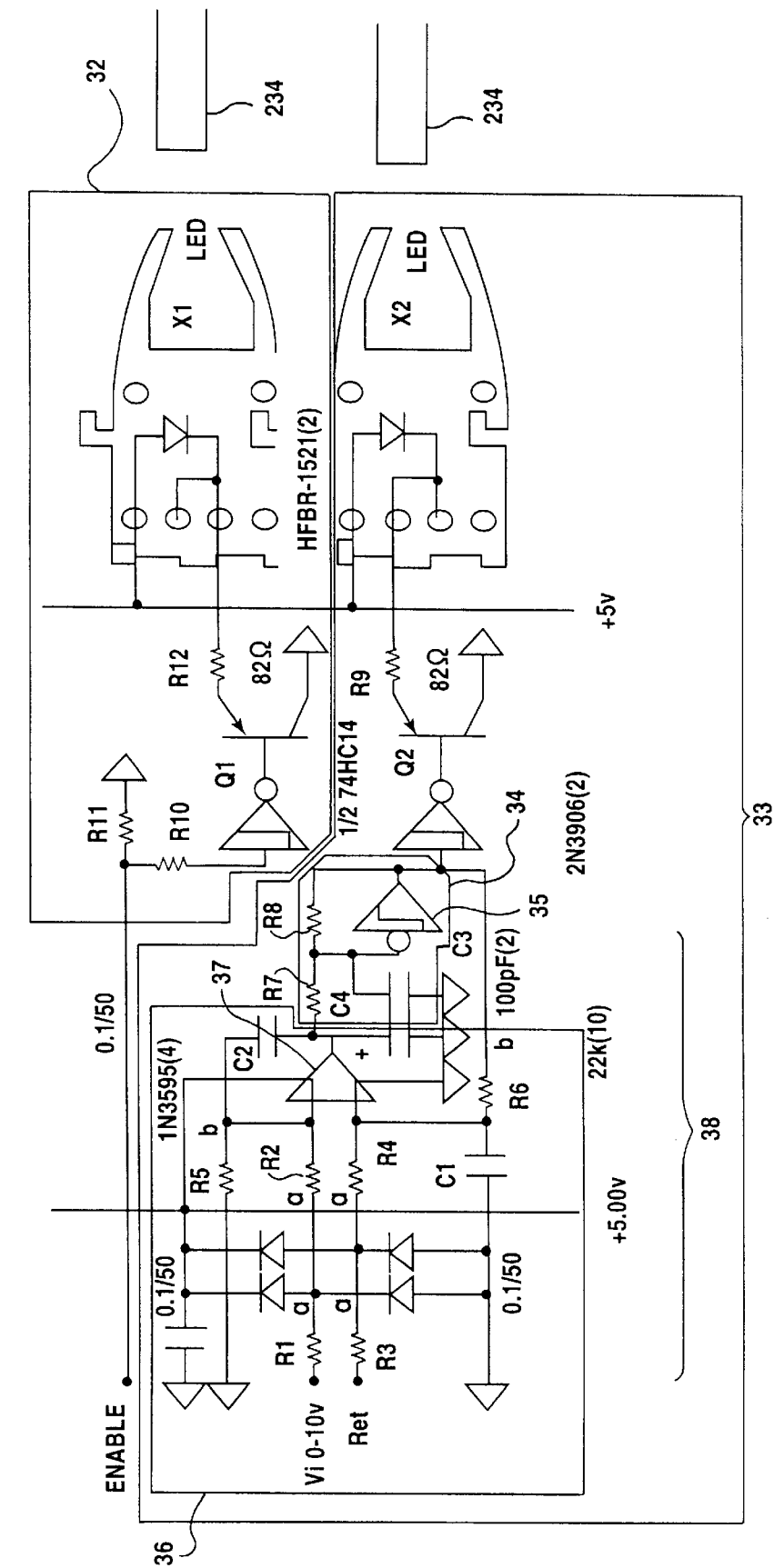
FIG. 7 is a circuit diagram of an embodiment of a transmitter used in the implanter of FIG. 1.
Figure 8:
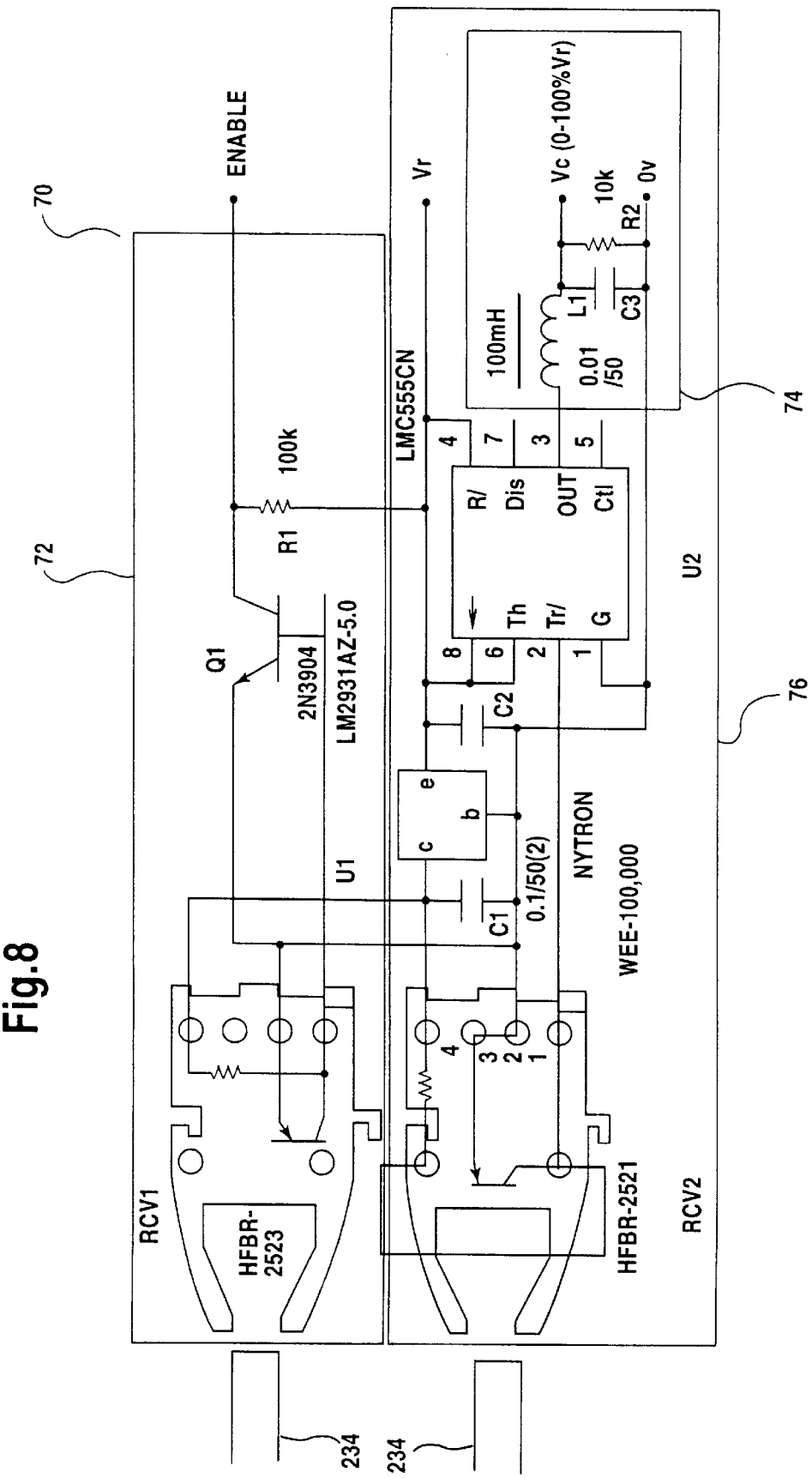
FIG. 8 is a circuit diagram of an embodiment of a receiver used in the implanter of FIG. 1.

Having described modulator 25, we will now describe embodiments of an optical transmitter 30 (FIG. 7) and a receiver 40 (FIG. 8). Transmitter 30 can be used as any one of transmitters 240, 244, 246, shown in FIG. 3. Receiver 40 in turn can be used as any one of receivers 242, 248, 250 in FIG. 3.

Referring to FIG. 7, a transmitter circuit 30 employs a modulator similar to modulator 25 to produce an two-state signal whose duty cycle is proportional to the input signal Vi. A segment 32 of transmitter 30 transmits a simple digital value for the enable signal. Briefly, segment 32 is composed of components X1, R10, R11, Q1, R12 and a Schmitt inverter 34. This portion can be any type of transmitter for transmitting a digital value across a fiber optic link.

Another segment 33 includes a modulator similar to modulator 25. Segment 33 receives the control signal voltage Vi as an input and outputs an optical signal across a fiber optic cable 234 via LED X2. This portion includes a duty cycle modulator 34 composed of R7, R8, C3 and a Schmitt inverter 35 connected to R8. An operational amplifier 36 that drives modulator 34 is the input amplifier of modulator 30 which includes amplifier 36 and duty cycle modulator 34. Because modulator 34 is a DC voltage inverter, the sense of modulator 30 is the reverse of amplifier 36 alone, i.e. duty cycle modulator 34 inverts the output of the operational amplifier so that the feedback signal is negative as described above.

In some embodiments, input signal Vi has a range of 0–10V; however the CMOS technology used for the Schmitt invertor operates at a 0–5V range. Therefore, differential amplifier 36 has a gain of one half. (This also allows using the same value of resistor, e.g. 22k, throughout the circuit, to accommodate the use of multiple matched resistors.)

The use of a gain-of-one-half high-gain extended differential operational amplifier assures that the DC output voltage from the modulator will be exactly equal to half the signal voltage. Because DC output voltage of duty cycle modulator 34 is proportional to its duty cycle, the output duty cycle is forced by the feedback to be proportional to the input signal voltage.

Capacitor C1 is sufficiently large to filter out the AC portion of the modulator output at the junction of R6 and C1. Therefore, only the DC portion appears in the negative feedback signal (recall that the sense of the operational amplifier is reversed by the inverting modulator).

Capacitor C2 assures that AC input signals are also eliminated. Consider that for a large C2, all AC input current through R1 and R2 is shunted C2 to the negative output of differential amplifier 37. Therefore, AC input current does not flow through R5 to ground and therefore cannot produce an output signal to drive the modulator.

Capacitor C4 assures that high frequency electromagnetic interference (EMI) signals that are beyond the band width of operational amplifier 37 flow to ground and therefore do not rectify in the input to produce spurious signals.

The output signal duty cycle modulator 34 is applied to the base of transistor Q2 through an inverter. Therefore, in an ON state, duty cycle modulator 34 turns on Q2, which grounds resistor R9 through one base-emitter diode drop, applying power from the 5v supply to the fiber optic LED transmitter 2 to send light through the fiber optic line. When modulator output is at zero, transistor Q2 is shut off and no light flows through the fiber optic cable.

The ON duty cycle of the light through the fiber optic cable is substantially equal to the duty cycle of modulator 34 which is in turn inversely proportional to the signal input to extended modulator 38. (Note that since interruption of the cable will produce the same output as a zero input signal, using transmission of light in the fiber optic cable to represent the ON state prevents mishaps, such as inadvertently turning on the power supply during such interruptions.)

In some embodiments, the forward voltage across the X2 LED is about 1.7 volts, and the voltage across the base-emitter diode is about 0.7 volts, leaving about 2.6 volts across R9. This determines the current applied to the X2 LED (about 30 ma), and places the X2 LED in a suitable operating envelope for some fiber optic cables.

Referring to FIG. 8, a receiver circuit 70 at the other end of the link is shown. Receiver circuit 70 includes a digital portion 72 composed of Q1, RCVR1, and R1 for receiving the enable signal.

Receiver 70 also includes a segment 76 which may operate using a reference voltage supply commonly used by power supplies in implanter 200 to energize local control potentiometers. Output voltage of segment 76 is proportional to the signal duty cycle multiplied by the reference voltage.

We will now describe the structure and operation of segment 76 of receiver 70.

A 5v operating voltage for an Optical receiver RCVR2 is provided from a reference voltage Vr through a low drop out (LDO) voltage regulator U1, in some embodiments being a commercially available regulator available under trade designation LM2931AZ-5.0. Because voltage regulator U1 is a low drop out voltage regulator, in some embodiments it can still apply operating voltage of about 4.8 volts when the reference voltage is only 5v.

Segment 76 also includes a fiber optic receiver RCVR2, in some embodiments a commercially available receiver available under the trade designation HFBR-2521. Receiver RCVR2 contains an internal pull up resistor, which is connected to an open collector output of receiver RCVR2 (at pin 1). That signal is applied to a timer U2 (in some embodiments a commercially available timer available under the trade designation LMC555CN) at its trigger input (at pin 2) so as to operate as simple logic inventer.

As connected, in timer U2, a Trigger signal overrides a Threshold signal. Threshold input is connected to the power supply (Vr) to force a low output from timer U2. Therefore, when input Trigger signal is low (i.e., which is the output of receiver RCVR2 when it receives a light signal), it overrides Threshold and forces the output high. Timer U2 is thus solely used as a simple logic inverter.

When the fiber optic receiver is illuminated, its open collector output is turned ON (i.e. low voltage output), which drives the output of timer/inverter U2 at pin 3 HIGH. Because timer/inverter is CMOS circuit, the output of timer/inverter U2 is either equal to its power supply voltage or ground. But its power supply is connected to the programmable power supply's reference voltage. The DC output voltage from the low output resistance power driver stage of timer/inverter U2 is thus the reference voltage applied to its power supply terminal multiplied by the ON duty cycle of optical signal from the fiber optic cable. This is in turn proportional to the input signal voltage in the optical transmitter circuit described above.

In order to present only the average DC value of this pulse signal to the output, a low-pass filter is used at the output of timer/inverter U2 to remove its AC components. In the case of receiver 70, the low-pass filter that is used is a two-pole passive filter 74 that is connected to timer U2 and outputs the output control signal Vc. Filter 74 includes an inductor L1 and a capacitor C3. Filter 74 also includes a resistor R2 which controls the damping factor of filter 74.

Capacitors C1 and C2 are power supply bypasses for optical receiver RCVR2, voltage regulator U1, and timer U2 and keep these components from oscillating.

Unlike a frequency modulation or pulse width modulation receiver, transmitter 30 and receiver 70 do not need frequency or pulse width generators, regulators, or detectors. Relatively few components are needed for implementing transmitter 30 and receiver 70. Therefore, it is possible to construct both transmitter 30 and receiver 70 from commercially available components and to keep the size of the circuits small, enabling the circuits to be easily used with power supplies in implanter 200.

Other embodiments are within the scope of the following claims.

Figure 9:
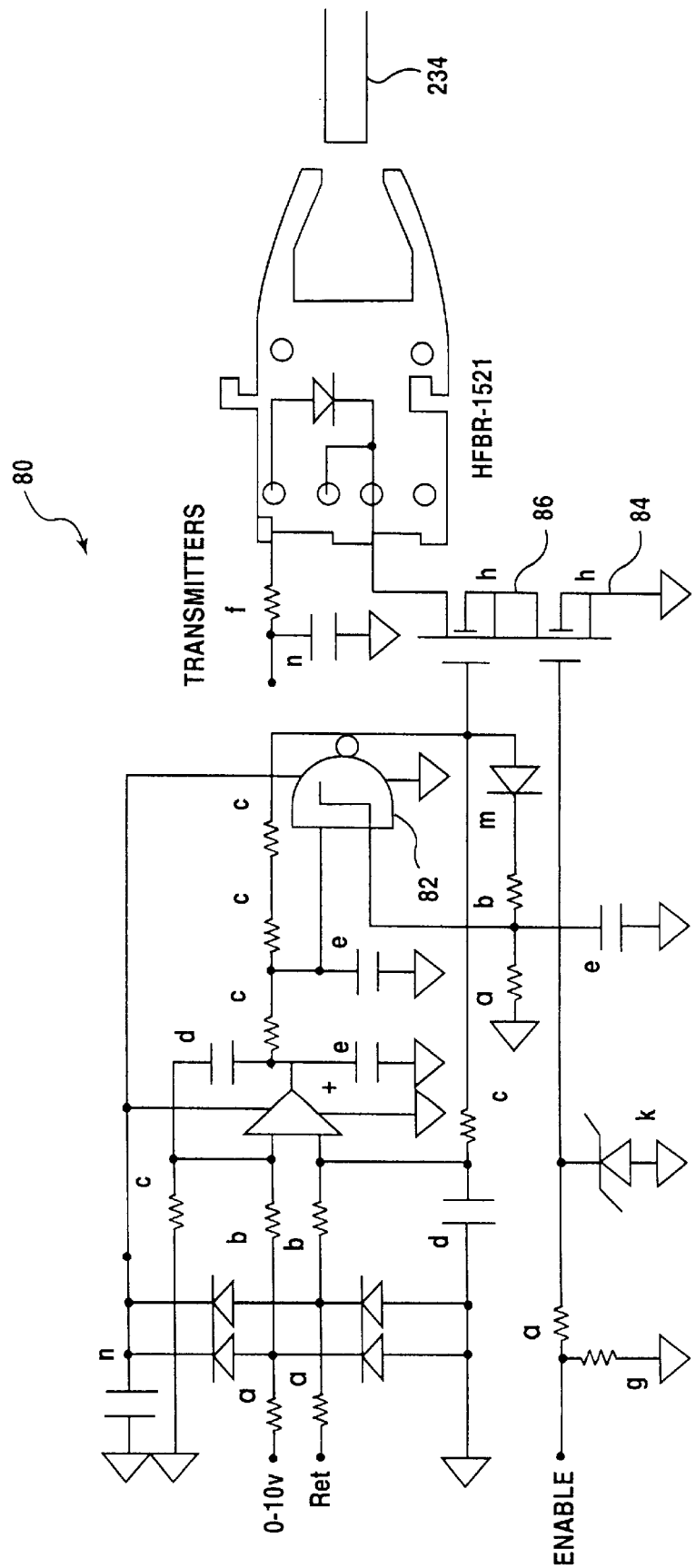
FIG. 9 is a circuit diagram of an alternative embodiment of a transmitter used in the implanter of FIG. 1.

For example, referring to FIG. 9, the digital enable command to the programmable power supply can be transmitted with the analog control signal. In this embodiment, the analog signal can go to zero only when the programmable power supply is disabled by enable signal going to zero. In transmitter 80, this is implemented by sending optical pulses when the enable signal is ON even if the input control voltage is zero.

In transmitter 80, instead of a simple inverter, a Schmitt NAND gate 82 is used as a modulator. A second oscillator feedback path is provided from output of NAND gate 82 to the second input of NAND gate 82. This path is designed to be very fast when going HIGH (enabling normal operation) and very slow when going LOW. Thus, if the output of the modulator is driven permanently HIGH (i.e. 100% duty cycle) by an out of range high input voltage, no change occurs in the operation. If, however, an out of range low input voltage is applied (i.e. an input of zero volts) and the modulator goes low (0% duty cycle, the high value resistor 'g' (e.g. a 10 megohm resistor) at the gate of NAND gate 82 slowly discharges its gate capacitor 'e' until NAND gate 82 is turned OFF. The output of NAND gate 82 then goes HIGH. Capacitor e is recharged briefly and so a short a pulse is transmitted to the output of NAND gate 82. This pulse is sent infrequently, and in some embodiments it results in only about 0.3% of full scale at the receiver. However, it is frequent enough to keep the receiver's enable signal operating (ON).

These signal pulses (FIG. 2) are then applied directly to a MOSFET transistor 84 which is connected in series with the output LED's modulating transistor 86. Therefore, when the enable signal is reduced to zero, no current can flow into the optical fiber transmitter LED X1. As will be described in detail below, with no pulses at all, the enable turns off at the receiver. The receiver enable and control signals then both drop to zero just as though the link had been severed.

Figure 10:
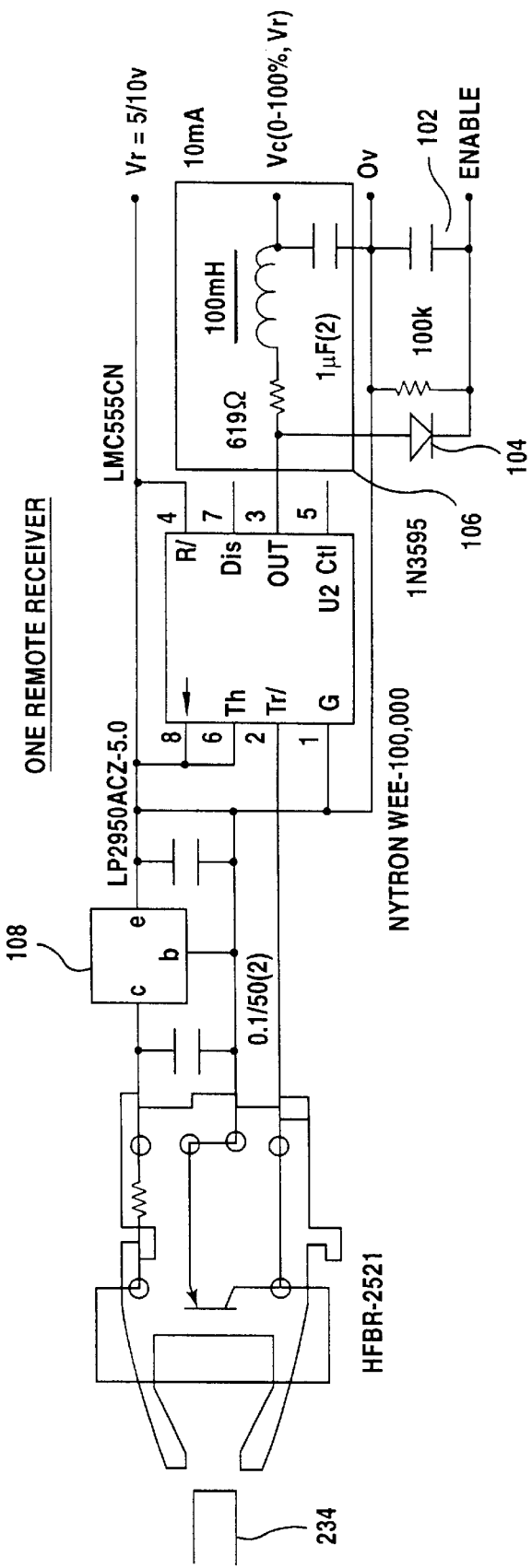
FIG. 10 is a circuit diagram of an embodiment of a receiver used in the implanter of FIG. 1.

Referring to FIG. 10, at a receiver 100, the output from timer U2 is rectified in a small diode 104 and delivered to the enable connection. As long as pulses arrive, diode 104 refreshes the voltage on a large output capacitor 102. Only when all pulses cease, does the enable signal cease as capacitor 102 discharges. Because a separate digital optical fiber line is not needed, a low power reference voltage is sufficient to operate embodiments of receiver 100 without requiring a separate power supply for the receiver.

In this embodiment, an output filter 106 has a resistor in series with an inductor, added to provide critical damping for the filter.

In this embodiment, in contrast to the embodiment described with reference to FIG. 8, a voltage regulator 108 (in some embodiments 9 commercially available regulator available under the trade designation LP2950ACZ-5.0) is selected to be stable with a small load capacitor, and also to require little operating current when it is in the dropout state when a reference voltage is provided by the programmable power supply at 5v. Therefore, receiver 80 can be supplied with a 5v power supply in the programmable power supply, if one is available. In that case, receiver 80 does not require a separate power source. (Note that, in some embodiments, receiver 80 can serves as a remote programming potentiometer, because its output is a desired proportion of the reference voltage applied to it, as multiplied by the duty cycle of the optical signal.) Some embodiments can accommodate programmable power supplies with reference voltages between 5v and 15 volts.

Figure 11:
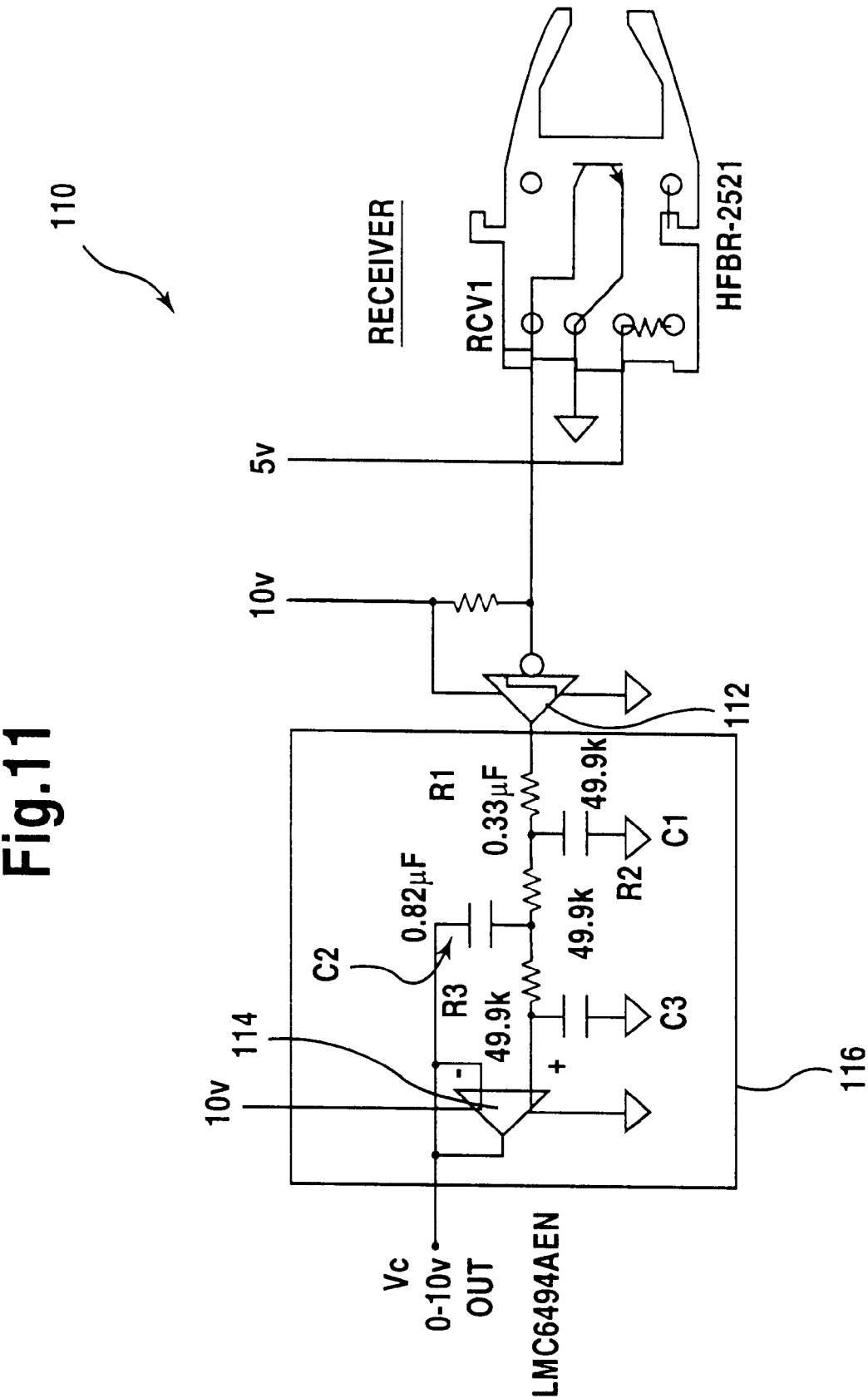
FIG. 11 is a circuit diagram of an alternative embodiment of a receiver used in the implanter of FIG. 1.

FIG. 11 shows an alternative embodiment of a receiver 110 that may be used, for example, at a voltage supply.

In the case of receiver 110, an active 3-pole low-pass filter 116, in contrast to passive filters in the previously described embodiment, is used.

In receiver 110, the pulses at the output of Schmitt inverter 112 drives the input of the filter at R1. For DC (the average value of the pulse signal), all capacitors in the circuit have no conductance. Also, at DC, the resistors carry no signal current, and so impose no signal voltage drops. Hence, at DC, the entire circuit is equivalent to voltage follower with a gain of one.

At sufficiently high frequencies, on the other hand, the capacitors all have low impedances. The combination of R1 and C1 forms a voltage divider at high frequencies that produces a single-pole rolloff with a slope of 6 db/8 ve (20 db per decade) because capacitor C1, at the bottom leg of voltage divider R1/C1, has an impedance that drops in value in inverse proportion to the frequency. The combination of R3 and C3 operates in the same manner.

At high enough frequencies, the output of operational amplifier 14 (used as a voltage follower) is negligible. Therefore, the "return" end of capacitor C2 attached to output Vc appears grounded. That is, the voltage at the "return" end of capacitor C2 is negligible compared to the signal voltage at the end connected to resistor R2, as will be described below. With capacitor C2 "grounded" in this manner, the slope of the transfer function from the junction of C1 and R2 (the output of the first R/C divider) through R2 to C2 is also 6db/8ve.

During operation, capacitor C2 is "grounded" at high frequencies in the following manner. The input at capacitor C3 to the operational amplifier (acting as a voltage follower) is much smaller than the signal voltage on C2, because the input is supplied by a voltage divider C3/R3 which greatly attenuates the input at high frequencies. But the output of the operational amplifier (which is the "grounded" end of C2 at high frequencies) is equal to the input voltage from the voltage divider C3/R3, which is much smaller at high frequencies than the signal voltage on C2. Therefore, the condition is fulfilled that C2 is essentially grounded. Therefore, in some embodiments, at high enough frequencies, the response of the entire filter is the combination of three 6 db/8 ve slopes in cascade, one for each "pole": 18 db/8 ve. In some embodiments, the shape of the filter is that of a Butterworth filter.

Although the present invention has been described in reference to an ion implanter, embodiments of the present invention may be used in a variety of applications which require simple and accurate communication of analog signals. Such applications includes systems in which a remote computer controls one or more client devices. Moreover, in other embodiments, other types of communication channels, besides fiber optic channels, may be used such as RF, electrical wires, or other modes of communication.

What is claimed is:

1. A transmitter for transmitting an analog signal comprising:

an input receiving the analog signal within a range of values, a duty cycle modulator generating a modulated two state signal having a maximum frequency at an intermediate value of said range, the duty cycle of the modulated signal being monotonically related to the analog signal while the frequency of the signal decreases with increase and decrease of the value of said analog signal from said intermediate value, and an output for transmitting the modulated signal on a communication channel.

2. The transmitter of claim 1 in which with increase of said analog signal from the intermediate value, the duration of a first of said two states increases more rapidly than does the second state decrease in duration, and with decrease of said analog values, the duration of the second state increases more rapidly than does the first state decrease.

3. The transmitter of claim 1 or 2 wherein the output comprises:

a fiber optic transmitter for transmitting a light signal corresponding to one of the states.

4. The transmitter of claim 1 or 2 the modulator comprises a square wave oscillator.

5. The transmitter of claim 4 the oscillator comprises a circuit having a switching threshold.

6. The transmitter of claim 5 the oscillator comprises a Schmitt logic circuit.

7. The transmitter of claim 6 the Schmitt logic circuit includes a Schmitt NAND gate.

8. The transmitter of claim 6 the Schmitt logic circuit includes a Schmitt inverter.

9. The transmitter of claim 8 wherein the Schmitt inverter comprises an input and an output and the oscillator further comprises:

a feedback circuit connecting said input to said output, and a capacitor connected to the input of the inverter.

10. The transmitter of claim 1 or 2 wherein the modulator comprises an output and an input and the input receiving the analog signal comprises a feedback circuit connected to the output of the modulator.

11. The transmitter of claim 10 the input further comprising circuit for comparing a signal from the feedback circuit to the analog signal.

12. The transmitter of claim 11 the input further comprises a differential amplifier, connected to the input of the modulator, the amplifier having a first and second input, the first being connected to the feedback signal and the second input being connected to receive the analog signal.

13. The transmitter of claim 1 or 2 wherein the duty cycle is related to an amplitude the analog signal.

14. A receiver for receiving a signal comprising:

an input receiving a modulated two state signal from a transmitter, the signal having a maximum frequency at an intermediate value of a range of input signal to the transmitter, the duty cycle of the modulated signal being monotonically related to the analog signal while the frequency of the signal decreases with increase and decrease of the value of said analog signal from said intermediate value, and circuit for translating the received signals to an output analog signal.

15. The receiver of claim 14 wherein the circuit for translating increases said output analog signal from an intermediate output value corresponding to intermediate input value when the duration of a first of said two states increases more rapidly than does the second state decrease in duration, and decreases said output analog signal, when the duration of the second state increases more rapidly than does the first state decrease.

16. The receiver of claim 15 wherein the circuit translates the received signal to an analog signal by relating the duty cycle of the received signal to a reference voltage.

17. The receiver of claim 14 or 15 wherein the input receives the modulated signal as an optical signal via a fiber optic cable.

18. The receiver of claim 14 or 15 wherein the circuit comprises a low pass filter for translating said modulated signal to the analog signal.

19. The receiver of claim 18 wherein the low pass filter is an active filter.

20. The receiver of claim 19 wherein the low pass filter is a passive filter.

21. An ion implanter for implanting ions in a workpiece, comprising an apparatus for generating an ion beam and directing it toward a surface of a work piece, a transmitter comprising:

an input receiving the analog signal within a range of values, a duty cycle modulator generating a modulated two state signal having a maximum frequency at an intermediate value of said range, the duty cycle of the modulated signal being monotonically related to the analog signal while the frequency of the signal decreases with increase and decrease of the value of said analog signal from said intermediate value, and an output for transmitting the modulated signal on a communication channel, and a receiver comprising:

an input receiving the modulated two state signal from the transmitter, and circuit for translating the received signals to an output analog signal.

22. The ion implanter of claim 21 in which with increase of said analog signal from the intermediate value, the duration of a first of said two states increases more rapidly than does the second state decrease in duration, and with decrease of said analog values, the duration of the second state increases more rapidly than does the first state decrease.

23. The ion implanter of claim 21 or 22 wherein the ion implanter comprises a component controllable by the analog signal.

24. The ion implanter of claim 23 wherein the component is a programmable power supply.

25. The ion implanter of claim 21 or 22 wherein the ion implanter comprises a component, an attribute of which is represented by the analog signal.

26. The ion implanter of claim 25 wherein the component is a programmable power supply.

27. The ion implanter of claim 26 wherein the represented attribute is an operating voltage of the power supply.

28. The ion implanter of claim 27 wherein the represented attribute is an operating current of the power supply.

* * * * *